Patented Mar. 28, 1950

2,502,353

UNITED STATES PATENT OFFICE 2,502,353

COATED FABRIC AND PROCESS OF MAKING SAME

David J. Sullivan, Fairfield, Conn., assignor to E. I. du Pont de Nemours & Company, Wilmington, Del., a corporation of Delaware No Drawing. Application May 18, 1946, Serial No. 670,853

12 Claims. (Cl. 117—76)

This invention relates to the production of coated fabrics such as is used for seats in theatres, omnibuses, railway coaches, trucks, restaurants, and dance halls, and for similar upholstery which receives rough usage, and which of necessity must be resistant to abrasion, to constant flexing, and in many cases to the softening action of oils and greases.

In recent years great improvements have been made in coated fabrics especially as regards appearance and durability, however, in the uses mentioned above, even the most durable coated fabrics show a failure along creases subjected to repeated flexing. The present invention represents a new and novel method of prolonging the useful life and appearance of such coated fabrics.

It is, therefore, an object of this invention to provide a new process of making coated fabrics. It is another object of this invention to provide new and improved coated fabrics for use in upholstery having greatly increased resistance to flexing and abrasion. Other objects will become apparent as the description of the invention proceeds.

I have discovered that such improved fabrics can be prepared by using neoprene (2 chlorobutadiene 1,3 plastic polymer), acrylonitrile-butadiene copolymers, and other synthetic elastomers together with "modified polyhydric alcohol-polybasic acid resins" in which the latter is formed in situ within the elastomer compound. By the term "modified polyhydric alcohol-polybasic acid resin," as used herein, I mean the resinous condensation product resulting from the reaction of one or more polyhydric alcohols, one or more polybasic acids, and one or more of the following modifying ingredients: semi-drying oils, semi-drying oil acids, non-drying oils, non-drying oil acids, or natural acidic resins, or mixtures of these modifying ingredients.

It is to be understood that the marked improvement in those physical properties which are essential in a good upholstery material is a direct result of the formation "in situ" of the "polyhydric alcohol-polybasic acid resins." It has been established that the addition of a preformed alkyd resin of the type in question to a selected elastomer will not give the desired physical properties in the synthetic rubber film.

The following examples are given by way of illustration, but not as a limitation of the invention.

Example I

A sheet of fabric (sateen 54" wide, 1.12 yards per pound) is coated on a conventional spreader with 2.5 ounces per linear yard of the following composition:

|  | Parts by weight |
|---|---|
| Neoprene[1] | 100 |
| Cumarone resin | 5 |
| Pine tar | 3.25 |
| Magnesium oxide | 4.0 |
| Whiting | 16.5 |
| Zinc oxide | 5.0 |
| "Neozone"[2] | 1.5 |
| "MBTS"[3] | 0.3 |

[1] Plastic polychloroprene made according to U. S. Pat. 2,264,173—Example 25.
[2] Antioxidant for neoprene—marketed by du Pont—phenyl-beta-naphthylamine.
[3] Retarder for neoprene—benzothiazyl disulfide—marketed by du Pont.

On top of this, 9.0 ounces per linear yard of the following composition is applied by calendar rolls:

|  | Parts by weight |
|---|---|
| Neoprene[1] | 100 |
| Barak[2] | 2 |
| Rubbex[3] | 2 |
| Kalite[4] | 34 |
| Circo oil[5] | 4.0 |
| Colored pigment | 20 |
| Stearic acid | 0.5 |
| Zinc oxide | 37.0 |
| Ground leather | 23.0 |
| Magnesium oxide | 4.0 |

[1] Plastic polychloroprene made according to U. S. Pat. 2,264,173—Example 25.
[2] Dibutyl-ammonium oleate—used for release agent—marketed by du Pont.
[3] Rubber—composition unknown—used for release agent—marketed by Magnus Chemical Company.
[4] Calcium carbonate coated with stearic acid—used as inert filler—R. T. Vanderbilt Company.
[5] Light process oil—used as plasticizer for neoprene GN—marketed by Sun Oil Company.

And on top of this, 3.0 ounces (in three coats) per linear yard of a 30% solution of the following composition in 2-nitropropane is applied by a regular spreader:

|  | Parts by weight |
|---|---|
| Neoprene[1] | 100 |
| Zinc oxide | 43 |
| Magnesium oxide | 28.5 |
| Stearic acid | 1.0 |
| Kalite[2] | 40.0 |
| Colored pigment | 20.0 |
| "Modified polyhydric alcohol-polybasic acid resin" ingredients: | |
|     Glycerine | 18.5 |
|     Maleic anhydride | 18.5 |
|     Wood rosin | 91.5 |

[1] Interpolymer of chloroprene and acrylonitrile made in accordance with process of U. S. Pat. 2,395,649.
[2] Calcium carbonate coated with stearic acid—used as inert filler—R. T. Vanderbilt Co.

The fabric thus coated is then embossed by the conventional method, and cured for two hours at a temperature of 260 deg. F. During this curing cycle the neoprene is vulcanized through the agency of the metal oxides and accelerators and the ingredients of the "modified polyhydric alcohol-polybasic acid resin" react to form the resin in situ. The finished product will show little or no wear when subjected to 50,000 strokes against #10 duck in the standard Wyzenbeek abrasion test, and will withstand as much as 3,000 strokes against #240-J (LA2) silicon carbide cloth (marketed by Minnesota Mining & Manufacturing Company under the trade name Tri-M-ite Cloth) in the same test. A neoprene coated fabric identical with the above described except that the top coat contains no alkyd ingredients will fail in a few hundred strokes against duck in the Wyzenbeek abrasion test. The Wyzenbeek test is described in Federal Specification KKL-136-B for Leather; Artificial (Upholstery), dated October 8, 1945.

*Example II*

Instead of coating the fabric in three operations as disclosed in Example I, it may be prepared in two operations.

A sheet of fabric (sateen 54" wide, 1.12 yards per pound) base coated with 2.5 ounces of the same cement used in Example I is coated on a conventional calender with 11.5 ounces per linear yard of the following composition:

| | Parts by weight |
|---|---|
| Neoprene[1] | 50 |
| Neoprene[2] | 50 |
| Stearic acid | 1 |
| Zinc oxide | 30 |
| Magnesium oxide | 20 |
| Pigment | 10 |
| Rubbex[3] | 3 |
| Kalite[4] | 18 |
| Ground leather | 20 |
| Circo oil[5] | 10 |
| "Modified polyhydric-alcohol-polybasic acid resin" ingredients: | |
| Glycerine | 4.5 |
| Maleic anhydride | 4.5 |
| Wood rosin | 22.5 |

[1] Plastic polychloroprene made according to U. S. Pat. 2,264,173, Example 25.
[2] Interpolymer of chloroprene and acrylonitrile made in accordance with the process of U. S. Pat. 2,395,649.
[3] See column 2.
[4] See column 2.
[5] See column 2.

The coated fabric is embossed by conventional processes, and is then cured for two hours at 260 deg. F. The curing cycle causes the ingredients of the "modified polyhydric alcohol-polybasic acid resin" ingredients to react in situ. It will be obvious that higher or lower temperatures may be used with a corresponding decrease or increase in time of curing provided the alkyd resin ingredients react.

I prefer to use a "balanced" ratio of "modified polyhydric alcohol-polybasic acid resin" ingredients in the compositions. For example, when glycerine, maleic anhydride and wood rosin are employed, I use one molecule of tri-hydric glycerine, one molecule of di-basic maleic anhydride and one molecule of monobasic rosin acid.

While I have illustrated the invention with a rosin modified alkyd resin, it will be apparent that the rosin may be substituted in the same molecular ratio by non-drying and semi-drying oil acids as mentioned above. Likewise, other antioxidants, release agents to avoid sticking of the mass to the calender rolls, retarders, etc., may replace the particular ones given in the examples. Other elastomers having properties similar to the neoprene specified may be used in the examples in approximately the same amount. Although the type mentioned in the examples is preferred, the properties of any elastomer in a coating is greatly improved by reacting the alkyd resin components after they have been mixed with the synthetic elastomer.

I have found that I can use ratios of "modified polyhydric alcohol-polybasic acid resin" ingredients to synthetic elastomer vary from 50 to 150 parts for each 100 parts of elastomer. I prefer, however, to use a ratio of 120 parts of alkyd resin to 100 parts of elastomer.

Various other synthetic elastomers other than neoprene may be employed in this invention, but I have preferred to use neoprene because of its great resistance to oils and greases.

In an examination of other synthetic elastomers, I have found that certain butadiene-acrylonitrile copolymers work equally as well as the chloroprene-acrylonitrile copolymers in this type of system. It has been established that the most desirable physical properties are obtained with those butadiene-acrylonitrile copolymers having an acrylonitrile content of 30-50%, but beneficial effects can be realized with polymers containing more or less acrylonitrile. The trade names of some of the synthetic rubbers which are included in this classification are as follows: Hycar OR-15, Hycar OR-25, Perbunan 35, Perbunan 26, Butaprene NXM, Butaprene NL, Chemigum N-1, Chemigum N-3, etc. The butadiene-styrene type of synthetic rubber, while not as amenable to this process as the above mentioned elastomers, shows marked improvement in those properties essential for a good upholstery material when the modified polyhydric alcohol-polybasic acid resin ingredients are incorporated into it.

The coated fabrics of this invention, such as those disclosed in Example I, possess many advantages over other coated fabrics for upholstery use. In addition to their excellent abrasion resistance, they are highly resistant to weathering, and have excellent outdoor durability; they will not "cold crack" even at temperatures as low as −50° F.; they show a high resistance to the fatigue produced by multiple flexing over a large range of temperatures, and will withstand four times as many flexings at 0° F. without rupture, as will, for example, a vinyl resin coated fabric; they are highly resistant to oils and greases, and they hold the "grain" of the embossing much better than other elastomer-coated fabrics which do not have the "modified polyhydric alcohol-polybasic acid resin" formed in situ.

It will be apparent that I have developed new and useful coated fabrics, as well as new and useful processes of making them.

Since many widely different embodiments of this invention may be made without departing from the spirit and scope thereof, it is to be understood that I do not limit myself except as defined in the appended claims.

I claim:

1. In the process of making coated fabrics, the improvement which comprises coating said fabric with a polychloroprene composition, applying thereover a composition containing a copolymer selected from the group consisting of (a) butadiene and acrylonitrile and (b) chloroprene and acrylonitrile, in which the acrylonitrile content is between 30% and 50%, a polyhydric alcohol, a dibasic acid, and a modifying agent selected from the group consisting of semi-drying oils, semi-drying oil acids, non-drying oils, non-drying oil acids, natural acidic resins, and mixtures of these modifying agents, in such proportions as to form, on reaction, between 50 and 150 parts of a modified alkyd resin for each 100 parts of copolymer, and subsequently reacting same by heat to form the modified alkyd resin in the presence of the copolymer.

2. The process of claim 1 in which the modifying agent is a non-drying oil acid.

3. The process of claim 1 in which the modifying agent is a semi-drying oil acid.

4. The process of claim 1 in which the modifying agent is a natural acidic resin.

5. A coated fabric having a polychloroprene base coating and at least one superposed coating of a composition containing between 50 and 150 parts of a modified alkyd resin per 100 parts of a copolymer selected from the group consisting of (a) butadiene and acrylonitrile and (b) chloroprene and acrylonitrile, in which the acrylonitrile content is between 30% and 50%, a said modified alkyd resin having been formed thereon in the presence of the copolymer.

6. The product of claim 5 in which the alkyd resin is modified with a non-drying oil acid.

7. The product of claim 5 in which the alkyd resin is modified with a semi-drying oil acid.

8. The product of claim 5 in which the alkyd resin is modified with an acidic natural resin.

9. The process of preparing coated fabrics which are highly resistant to abrasion and flexing, which comprises coating a strong woven textile with about 2½ ounces per linear yard of 54 inch material of a composition containing the following:

| | Parts by weight |
|---|---|
| Polychloroprene | 100 |
| Coumarone resin | 5 |
| Vulcanizing agents, retarders, fillers as necessary | | applying thereto by calendering about 9 ounces per linear yard of a composition containing 100 parts of a polychloroprene together with vulcanizing agents, and thereafter applying a plurality of top coats containing about 1 ounce per linear yard of a composition containing about 100 parts of a copolymer of chloroprene and acrylonitrile, 18.5 parts of glycerine, 18.5 parts of maleic anhydride and 91.5 parts of wood rosin, and thereafter heating the said coated fabric to about 260° F. for 2 hours to react the glycerine, maleic anhydride, and wood rosin.

10. In the process of making coated fabrics, the improvement which comprises coating said fabric with a polychloroprene composition, applying thereover a composition containing a copolymer selected from the group consisting of (a) butadiene and acrylonitrile and (b) chloroprene and acrylonitrile, in which the acrylonitrile content is between 30% and 50%, glycerine, maleic anhydride, and wood rosin, in such proportions as to form, on reaction, about 120 parts of a wood rosin modified glycerol maleate for each 100 parts of copolymer, and subsequently reacting same by heat to form the modified alkyd resin in the presence of the copolymer.

11. The process of claim 1 in which the copolymer contains 50–70% butadiene and 30–50% acrylonitrile.

12. The process of claim 1 in which the copolymer contains 50–70% chloroprene and 30–50% acrylonitrile.

DAVID J. SULLIVAN.

REFERENCES CITED

The following references are of record in the file of this patent:

UNITED STATES PATENTS

| Number | Name | Date |
|---|---|---|
| 1,967,275 | Williams | July 24, 1934 |
| 1,967,860 | Carothers et al. | July 24, 1934 |
| 1,967,863 | Collins et al. | July 24, 1934 |
| 2,029,410 | Carothers et al. | Feb. 4, 1936 |
| 2,395,649 | Wagner | Feb. 26, 1946 |

FOREIGN PATENTS

| Number | Country | Date |
|---|---|---|
| 381,225 | Great Britain | Oct. 3, 1932 |